US007472285B2

(12) United States Patent
Graunke et al.

(10) Patent No.: US 7,472,285 B2
(45) Date of Patent: Dec. 30, 2008

(54) APPARATUS AND METHOD FOR MEMORY ENCRYPTION WITH REDUCED DECRYPTION LATENCY

(75) Inventors: Gary L. Graunke, Hillsboro, OR (US); Carlos Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 951 days.

(21) Appl. No.: 10/603,680

(22) Filed: Jun. 25, 2003

(65) Prior Publication Data

US 2005/0021986 A1 Jan. 27, 2005

(51) Int. Cl.
*H04L 9/00* (2006.01)

(52) U.S. Cl. ............... 713/193; 713/161; 380/262; 380/277

(58) Field of Classification Search ............. 713/193, 713/161; 380/28, 37, 255, 262, 277; 726/26; 711/100; 707/9; 705/75; 235/379–380
See application file for complete search history.

(56) References Cited

U.S. PATENT DOCUMENTS

| | | | |
|---|---|---|---|
| 4,529,870 A | | 7/1985 | Chaum |
| 5,259,025 A | * | 11/1993 | Monroe et al. .......... 705/75 |
| 5,345,508 A | * | 9/1994 | Lynn et al. ............ 380/46 |
| 5,757,919 A | | 5/1998 | Herbert et al. |
| 5,809,148 A | * | 9/1998 | Doberstein et al. ...... 713/161 |
| 6,937,727 B2 | * | 8/2005 | Yup et al. ............ 380/37 |
| 2003/0007635 A1 | * | 1/2003 | Li et al. ............. 380/28 |
| 2004/0030889 A1 | * | 2/2004 | Chin et al. ........... 713/160 |

FOREIGN PATENT DOCUMENTS

EP 0 908 810 A2 4/1999

OTHER PUBLICATIONS

Dworkin, Morris "Recommendation for Block Cipher Modes of Operation," *Methods and Techniques*, Computer Security, NIST, 2001 Edition, pp. i-vii, 9-16.
Yang, J. et al., "Fast Secure Processor for Inhibiting Software Piracy and Tampering", Proc. of 36th Int'l Symp. on Microarchitecture, IEEE, pp. 351-360, 2003, XP010674237.

* cited by examiner

*Primary Examiner*—Thanhnga B Truong
(74) *Attorney, Agent, or Firm*—Blakely, Sokoloff, Taylor & Zafman LLP

(57) ABSTRACT

A method and apparatus for memory encryption with reduced decryption latency. In one embodiment, the method includes reading an encrypted data block from memory. During reading of the encrypted data block, a keystream used to encrypt the data block is regenerated according to one or more stored criteria of the encrypted data block. Once the encrypted data block is read, the encrypted data block is decrypted using the regenerated keystream. Accordingly, in one embodiment, encryption of either random access memory (RAM) or disk memory is performed. A keystream is regenerated during data retrieval such that once the data is received, the data may be decrypted using a single clock operation. As a result, memory encryption is performed without exacerbating memory latency between the processor and memory.

25 Claims, 12 Drawing Sheets

APPARATUS AND METHOD FOR MEMORY ENCRYPTION WITH REDUCED DECRYPTION LATENCY

FIELD OF THE INVENTION

One or more embodiments of the invention relate generally to the field of cryptography. More particularly, one or more of the embodiments of the invention relates to a method and apparatus for memory encryption with reduced decryption latency.

BACKGROUND OF THE INVENTION

The proliferation of the Internet has led to the creation of a new form of commerce, generally referred to as Internet commerce or E-commerce. E-commerce enables the users to sell and purchase items from a worldwide community connected via the Internet. This added simplicity, coupled with the continually reduced costs and increasing processing speed of modern-day computers, has led to the inclusion of a personal computer (PC) in many homes throughout the world. Unfortunately, the proliferation of PCs within the homes throughout the world, as well as the use of such PCs for E-commerce, often results in the storage of sensitive information within a computer.

As a result, computer users become susceptible to rogue agents, which may desire to gain access to secure information loaded within a personal computer. In order to combat the various rogue agents from gaining access to the secure information, many computer systems employ some form of cryptographs in order to prevent access to sensitive information. As known to those skilled in the art, cryptography provides a technique for keeping information secret, for determining that the information has not been tampered with and for determining who authored pieces of information.

One form of cryptography involves public or private key systems wherein transmitted information is encrypted prior to transmission and decrypted by the receiver using either a public or private key. However, once the sensitive information arrives at its designated location, the information is often decrypted and stored. In other words, the sensitive information is not maintained in a secure format at its destination. As a result, during operation of a PC, a rogue agent could possibly gain access to the PC and gain access to the sensitive information.

Furthermore, the proliferation of E-commerce has led to the availability of media applications, such as motion pictures and music, which may be downloaded to a PC for one-time use or for use for a predetermined period of time. Unfortunately, without some mechanism for protecting the contents of such media applications from access by rogue agents, E-commerce with regard to media applications may be prohibitive to the media providers. One technique for possibly protecting the sensitive information of a computer system is memory encryption. Unfortunately, memory encryption is currently not performed within modern computer systems due to the bottleneck that currently exists between processors and memory.

Although processor speeds continually increase in response to the growing demands of media and graphics applications, memory performance increases have not kept pace with the reduction in processor clock periods. The problems of memory latency, or the time required to access a data unit, in addition with the increasing bandwidth of such media and graphics applications, require innovative memory architectures if processor performance is to continue to increase.

As a result, performing memory encryption by, for example a microprocessor, is not feasible because the memory encryption in read operations would introduce additional latency beyond the current bottleneck that exists between processors and memory.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for memory encryption with reduced decryption latency are described. In one embodiment, the method includes reading an encrypted data block from memory. During reading of the encrypted data block, a keystream used to encrypt the data block is regenerated according to one or more stored criteria of the encrypted data block. Once the encrypted data block is read, the encrypted data block is decrypted using the regenerated keystream. Accordingly, in one embodiment, encryption of either random access memory (RAM) or disk memory is performed. A keystream is regenerated during data retrieval such that once the data is received, the data may be decrypted using a single clock operation. As a result, memory encryption is performed without exacerbating memory latency between the processor and memory.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logical. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like. In one embodiment, the present invention may be provided as an article of manufacture which may include a machine or computer-readable medium having stored thereon instructions which may be used to program a computer (or other electronic devices) to perform a process according to one embodiment of the present invention.

System

Figure 1:
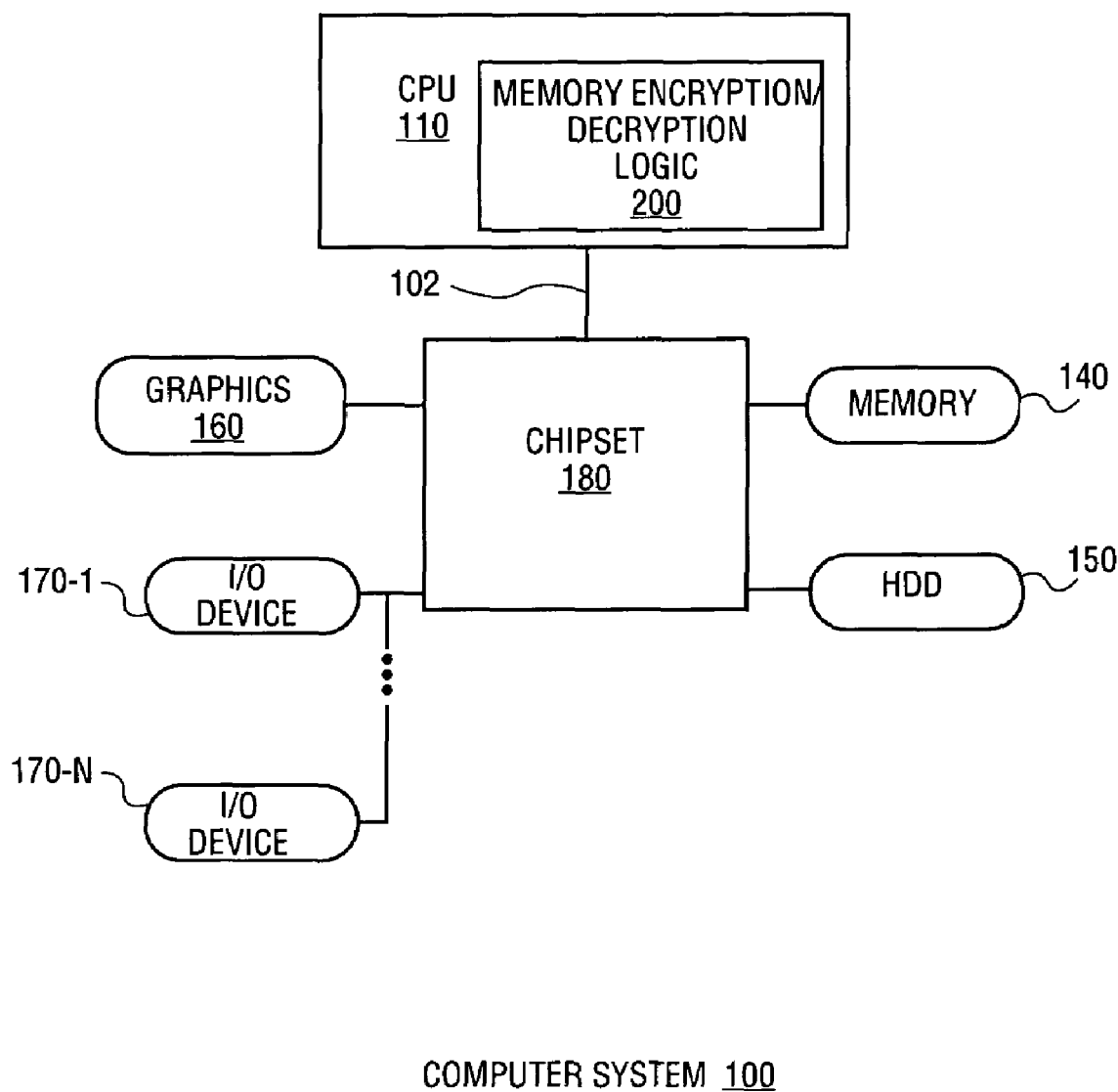
FIG. 1 is a block diagram illustrating a computer system including a processor having memory encryption/decryption logic to enable memory encryption with reduced decryption latency, in accordance with one embodiment of the invention.

FIG. 1 is a block diagram illustrating a computer system 100 including memory encryption/decryption logic 200, in accordance with one embodiment of the invention. Computer system 100 comprises a processor system bus (front side bus (FSB)) 102 for communicating information between a processor (CPU) 110 and a chipset 180, coupled together via FSB 102. As described herein, the term "chipset" is used in a manner well-known to those of ordinary skill in the art to describe, collectively, the various devices coupled to CPU 110 to perform desired system functionality.

Chipset 180 is coupled to main memory 140 and one or more graphic devices 130. In one embodiment, main memory 110 is volatile memory including, but not limited to, random access memory (RAM), synchronous RAM (SRAM), double data rate (DDR), S Data RAM (SDRAM), RAM bus data RAM (RDRAM), or the like. In addition, hard disk drive devices (HDD) 150, as well as one or more input/output (I/O) devices 170 (170-1, . . . ,170-N) are also coupled to chipset 180. As illustrated, CPU 110 includes memory encryption/decryption logic 200, which is further described with reference to FIG. 2.

Figure 2:
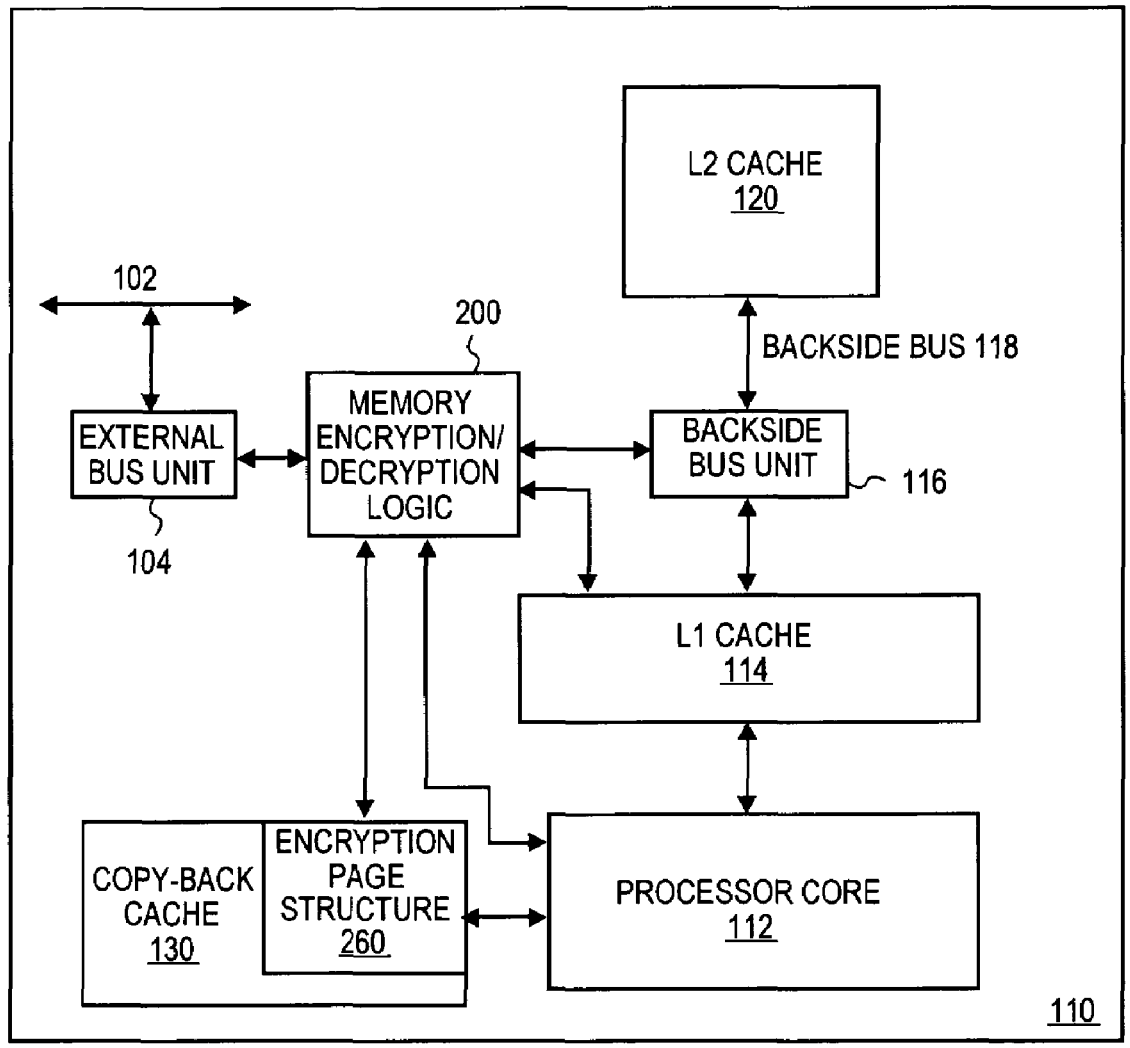
FIG. 2 is a block diagram further illustrating the processor, as depicted in FIG. 1, in accordance with a further embodiment of the invention.

FIG. 2 further illustrates CPU 110, to illustrate memory encryption with reduced decryption latency, in accordance with one embodiment of the invention. CPU 110 is comprised of processor core 112, which may include, for example, copyback cache 130, as well as level one (L1) cache 114 for high speed temporary storage of data. In addition, processor or CPU 110 may include level two (L2) cache 120. As illustrated, L2 cache 120 is offchip memory coupled to backside bus unit 116 via, for example, backside bus 118. Likewise, CPU 110 includes external unit 104 for interfacing with FSB 102, as depicted in FIG. 1.

However, in contrast to conventional CPUs, CPU 110 includes memory encryption/decryption logic 200. In one embodiment, logic 200 enables CPU 110 to securely encrypt contents of, for example, volatile memory, such as, for example, main memory 140, as depicted in FIG. 1 using a cipher algorithm. The security provided by a block cipher algorithm consists of two processes that are inverses of each other: encryption and decryption. Encryption is the transformation of a usable message called plaintext into an unreadable form called ciphertext. Conversely, decryption is the transformation that recovers the plaintext from the ciphertext.

In one embodiment, memory decryption is provided by performing keystream regeneration during a memory read of an encrypted data block (ciphertext). Once the ciphertext is available, the ciphertext is decrypted using the regenerated keystream, within, for example, a single clock cycle. As a result, inherent memory latency between a processor and main memory is minimally exacerbated while enabling encryption of data contained within, for example, RAM, disk memory or the like. Encryption/decryption logic 200, as well as encryption page structure 250 are further illustrated with reference to FIG. 3, in accordance with one embodiment of the invention.

Figure 3:
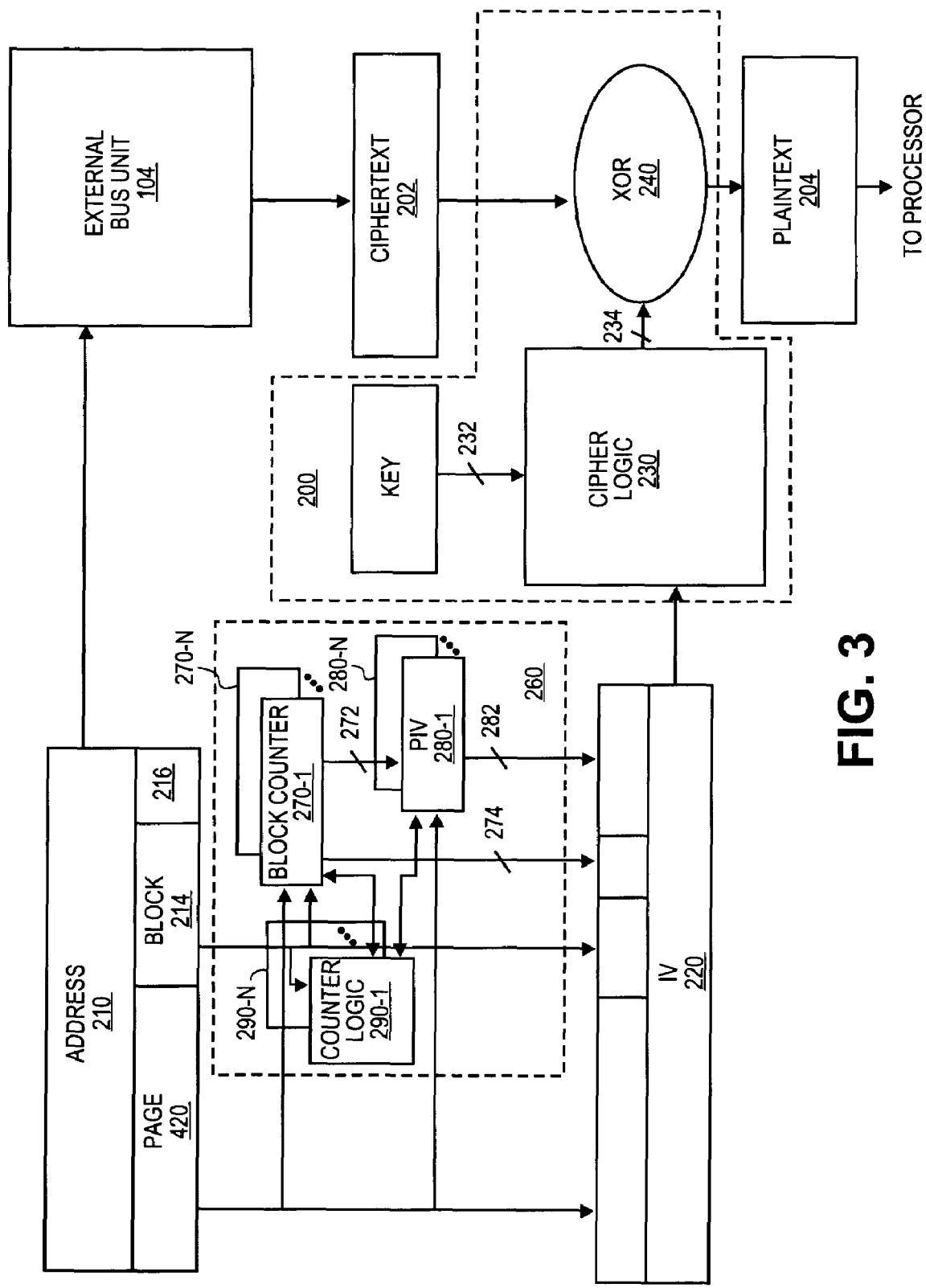
FIG. 3 is a block diagram further illustrating the processor, memory encryption/decryption logic, and encryption page structure, as depicted in FIG. 2, in accordance with a further embodiment of the invention.

FIG. 3 illustrates logic 200 in an embodiment for a memory read decryption operation, in accordance with one embodiment of the invention. As illustrated logic 200 includes cipher logic 230 to generate a keystream 234 according to a secret key 232, as well as an initialization vector (IV) 220. Once the keystream is formed, logic 200 performs a logical exclusive OR operation (XOR) of keystream 234 with ciphertext 202, using XOR block 240. to form plaintext 204. In one embodiment, cipher logic 230 is, for example, advanced encryption standard (AES), cipher serpent or other like symmetric block cipher algorithm.

There are two basic types of symmetric encryption/decryption algorithms: block ciphers and stream ciphers. Block ciphers operate on blocks of plaintext and ciphertext comprised, for example, of N-bits. In contrast, stream ciphers operate on streams of plaintext and ciphertext, one bit or byte at a time. With a block cipher, the same plaintext block always encrypts to the same ciphertext block using the same key. In contrast, the same plaintext byte or bit will encrypt to a different bit or byte each time the plaintext is encrypted when using a stream cipher. This discrepancy arises since a block cipher takes a secret key and a plaintext value and runs through many rounds of the cipher to produce the ciphertext directly.

Conversely, block cipher decryption takes the same key and the ciphertext and runs through many rounds of an inverse cipher to produce plaintext. Generally, the many rounds of a cipher performed in both of the cases takes up a substantial amount of time and are thus unsuitable for memory read decryption due to the inherent latency between processor and memory. Accordingly, in the embodiment depicted, cipher logic 230 uses a reduced number of rounds to match the memory read latency while still providing adequate security. In other words, a block cipher that supports an encryption mode for generating a keystream within the time required to fetch data from memory is used as cipher logic 230. In an alternative embodiment, a stream cipher may be used for cipher logic 230.

As known to those skilled in the art, a stream cipher uses a secret key and possibly an initialization vector (IV) or public value that may change and runs some function to produce a keystream. Once the keystream is generated, the keystream is combined with the plaintext to produce the ciphertext within a single clock operation. Conversely, stream cipher decryption consists of the rerunning of the cipher in the same state as encryption to produce the same keystream. The keystream is combined with the ciphertext using an inverse operation to produce the plaintext.

Referring again to FIG. 3, the input the cipher logic 230 is a secret key 232 which may, for example, be generated by CPU 110 during initial boot-up and retained until power off (when memory contents are no longer needed). IV 220 is used in the encryption of plaintext and in the corresponding decryption of ciphertext, although IV 220 need not be kept secret in contrast to key 232, which must be kept in secret. In order to efficiently use cipher logic 230 to provide optimal security, unpredictable initialization vectors are required. In other words, cipher logic 230 described herein requires an IV that is a NONCE (i.e., the IV must be unique for each execution of the mode under the given key).

In one embodiment, cipher logic 230 may function according to a counter mode (CTR) that features the application of forward cipher to a set of input blocks called counters to produce a sequence of output blocks that are logically combined (XOR) with the plaintext to produce the ciphertext and vice versa. Generation of the unique IV is required since, if a plaintext block that is encrypted using a known IV value, then the output of the forward cipher function is easily determined from the associated ciphertext. This output allows easy recover of easy recovery of any other plaintext blocks that are encrypted using the same IV from their associated cipher blocks. As such, in order to generate unique IVs, in one embodiment, an encryption page structure 260 is provided.

As illustrated in FIG. 3, encryption page structure 260 is designed to store one or more counters for each page as well as each data block within a memory system, such as memory 140 as illustrated in FIG. 1, which are stored in, for example, counter logic 290. In the embodiment illustrated, counter block 290 may include, for example, a page write counter for tracking the number of page writes (PWC) to a given page, as well as a current initialization vector value (IVC). In embodiments which use a current initialization vector value IVC, each page within the memory system may be assigned an array of V initialization vectors, which are formed using, for example, a random number generator (not shown). In such an embodiment, IVs are stored within a data structure such as, for example, page IV (PIV) block 280 (280-1, ..., 280-N), which includes a predetermined number of unique values for each page to enable generation of unique IVs for each execution.

As indicated above, generation of a unique IV is required to provide optimal security and prevent the prediction of initialization vectors. One technique for generating an IV that is unique for each execution is the generation of a new IV for each memory write. Unfortunately, IVs can take up to 50-100 percent as much space as the original data depending on the relative size of the IVs with reference to the cache block size. As a result, due to the space constraints caused by generating a new IV for each write, the new IVs could not be stored on-chip in temporary memory (cache memory).

Consequently, for each read operation from memory, a separate read would have to be performed to locate the off-chip IV used to encrypt the data. As a result, this separate read operation must be performed before the keystream can be generated to decrypt data read from encrypted memory. Unfortunately, this separate read would further exacerbate the latency that already exists between processor and memory and therefore is not an adequate solution.

As such, in one embodiment, a page level table is used to store a reduced number of, for example, 64-bit random numbers ("page IVs") for use in the formation of initialization vectors for all cache blocks in a page. Therefore, by using a reduced number of 64-bit page IVs, the 64-bit page IVs are used to form a unique IV for each write, while providing storage of the page IVs within on-chip memory, and eliminating the additional read as described above.

Accordingly, in response to a memory read operation, an encrypted data block is requested from memory via, for example, external bus unit 104 (FIG. 2) according to address 210. Based on, for example, the page address, encryption page structure 260 is queried to identify a corresponding page within, for example, PIV 280. In addition, an index to PIV 280 is provided via a data structure such as a block IV counter (BC) 270 (270-1, ..., 270-N). In one embodiment, BC 270 stores, for example, a two-dimensional data structure including a PWC value, as well as an initialization vector index or IVC value.

Accordingly, based on the page address as well as the block address, BC 270 provides an index to PIV 280 to provide block IV value 282, as well as a block counter value 274, stored during encryption of plaintext 204, to form IV 220. In a further embodiment, initialization vector 220 includes a page address 212 and an N-C bit most significant bits (MSB) of block address 214, where N represents a bit length of the address, while C represents a bit length of block counter value 274. In one embodiment, P is a log2 (number of bytes in a page), C is log2 (number of bytes in a cache block), N is (P-C), or N is log2 (number of cache blocks in a page). Based on this information, a unique IV 220 is formed provided to cipher logic 230 to generate keystream 234.

Figure 4:
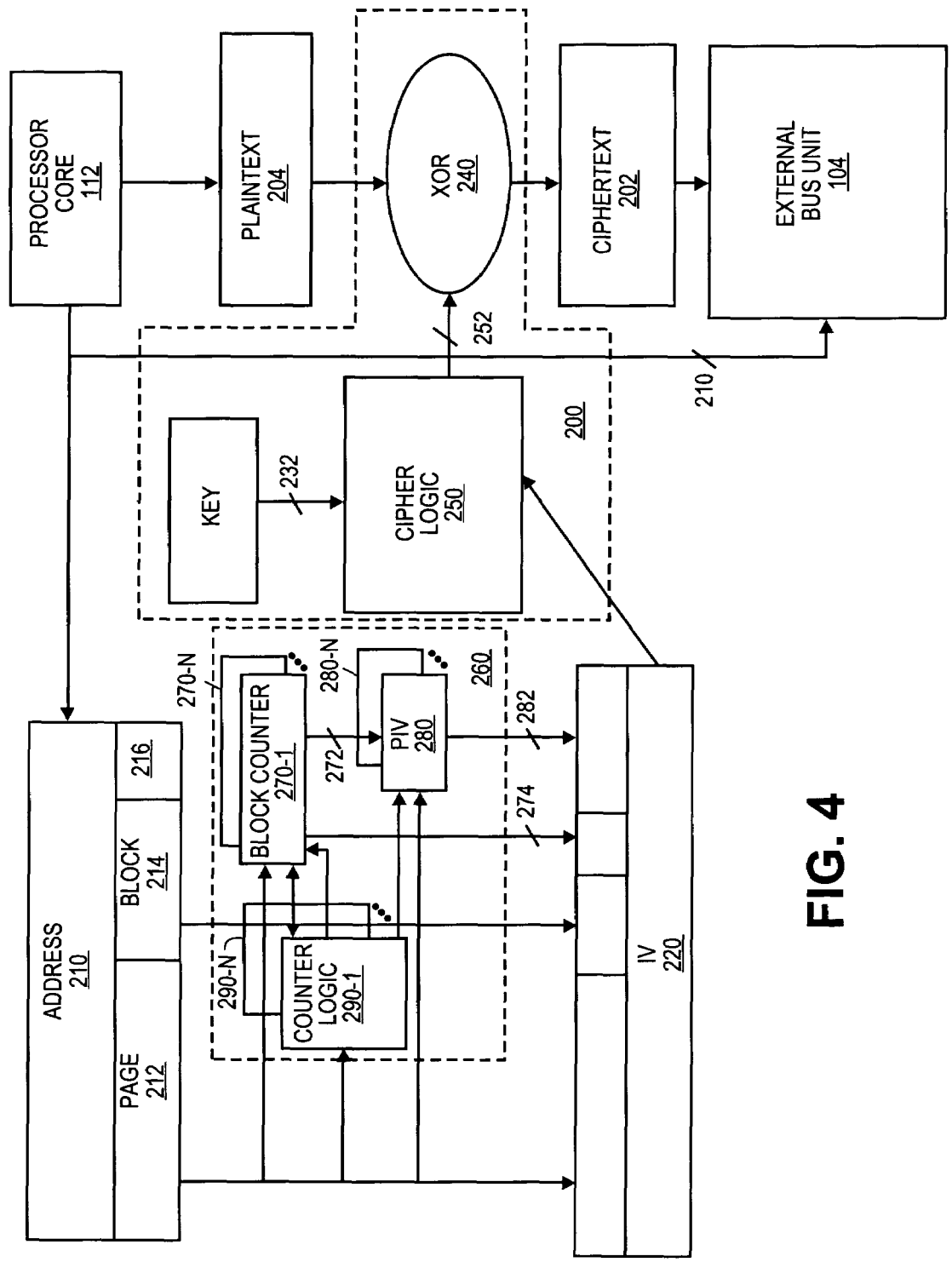
FIG. 4 is a block diagram further illustrating the processor, the memory encryption/decryption logic, and the encryption page structure, as depicted in FIG. 2, in accordance with a further embodiment of the invention.

As illustrated in FIG. 4, counter logic 290 includes, for example, a PWC value and a current IVC value for each page. Accordingly, in response to a write request of plaintext 204, a current IVC value is used to reference PIV 280 to generate a block IV value 282. In addition, a current PWC value is used as a block counter value 274. In one embodiment, the block IV value 282 and block counter value 274 are stored within BC 270 according to a block number of plaintext 204.

In one embodiment, an N-C most significant bits of block address 214, as well as page address 212, complete formation of IV 220. As such, using the counter values in conjunction with reuse of a page initialization vector, IV 220 is guaranteed to be unique for each iteration without the need for off-chip storage of IVs. Accordingly, utilizing IV 220, the stream cipher 250 generates keystream 252 using IV 220 as well as secret key 232. Once keystream 252 is generated, keystream 252 is combined with plaintext 204 using, for example, XOR logic 240 to form ciphertext 202. Once formed, ciphertext 202 may be provided to external bus unit 104 which writes the ciphertext to memory according to address 210.

In a further embodiment, as illustrated with reference to FIG. 5, IV recode logic 300 is responsible for detecting whether an IV 220 of a data block is stale. In one embodiment, recode logic 300 is responsible for ensuring that a unique IV is generated for each write operation to prohibit unauthorized decryption of data. As a result, the amount of storage required for the page IVs may be limited to a constant value. In addition, the amount of extra reads and writes that are required for recoding of data having a stale IV can be reduced by increasing the number (V) of page IVs.

In one embodiment, this is performed by identifying a data block having the oldest or least recently used IV 220. When such is detected, using for example stale IV logic 320, recode logic 330 may select a new IV 332 and recode (re-encrypt) the identified data block using cipher logic 230 and cipher logic 250 to form ciphertext 202. In one embodiment, new IV 332 is generated by replacing a page IV portion of the stale IV with a different page IV from PIV 280 according to a current value of IVC 272 for the page containing the identified data block. In one embodiment, block cipher 230 (FIG. 5) is another instance of stream cipher 250, such that the same stream cipher is to decrypt and re-encrypt).

In one embodiment, recoding of data having a stale IV can be performed by a software or microcode interrupt routine by having recode logic 330 raise an exception when recode is required. Accordingly, the recode logic could be simplified to performing the detection of data having a stale IV and the issuance of an interrupt. In one embodiment, data recodes are spread out over time, such that at most one recode is performed per write operation.

In an alternative embodiment, recoding may be scheduled in an empty slot in the memory pipeline. Accordingly, by using the reduced number of page initialization vectors in conjunction with the recode logic 330, the amount of space required for storage of IV values is very small when compared to the storage requirements of data and therefore enables on-chip storage of IVs such that an additional read operation of off-chip IVs is not required to achieve substantial system security.

Accordingly, stale IV 220 is provided to cipher logic 230 to decrypt ciphertext 202 to produce plaintext 204. Concurrently, new IV 332 is provided to cipher logic 250 to produce keystream 254 for re-encrypting plaintext 204. Accordingly, recode logic 330 provides additional security features by preventing prediction of IV 220. In one embodiment, this is performed using the following equation within stale IV logic 320:

$$BC\ [PWC] = (IVC+1) \bmod V \qquad (1)$$

As a result, the embodiments described preserve the performance and security properties of the cipher logic by generating new initialization vectors for each write while minimizing additional storage requirements for initialization vectors by recoding old data so old initialization vectors do not need to be retained. Procedural methods for implementing embodiments of the invention are now described.

Operation

Figure 6:
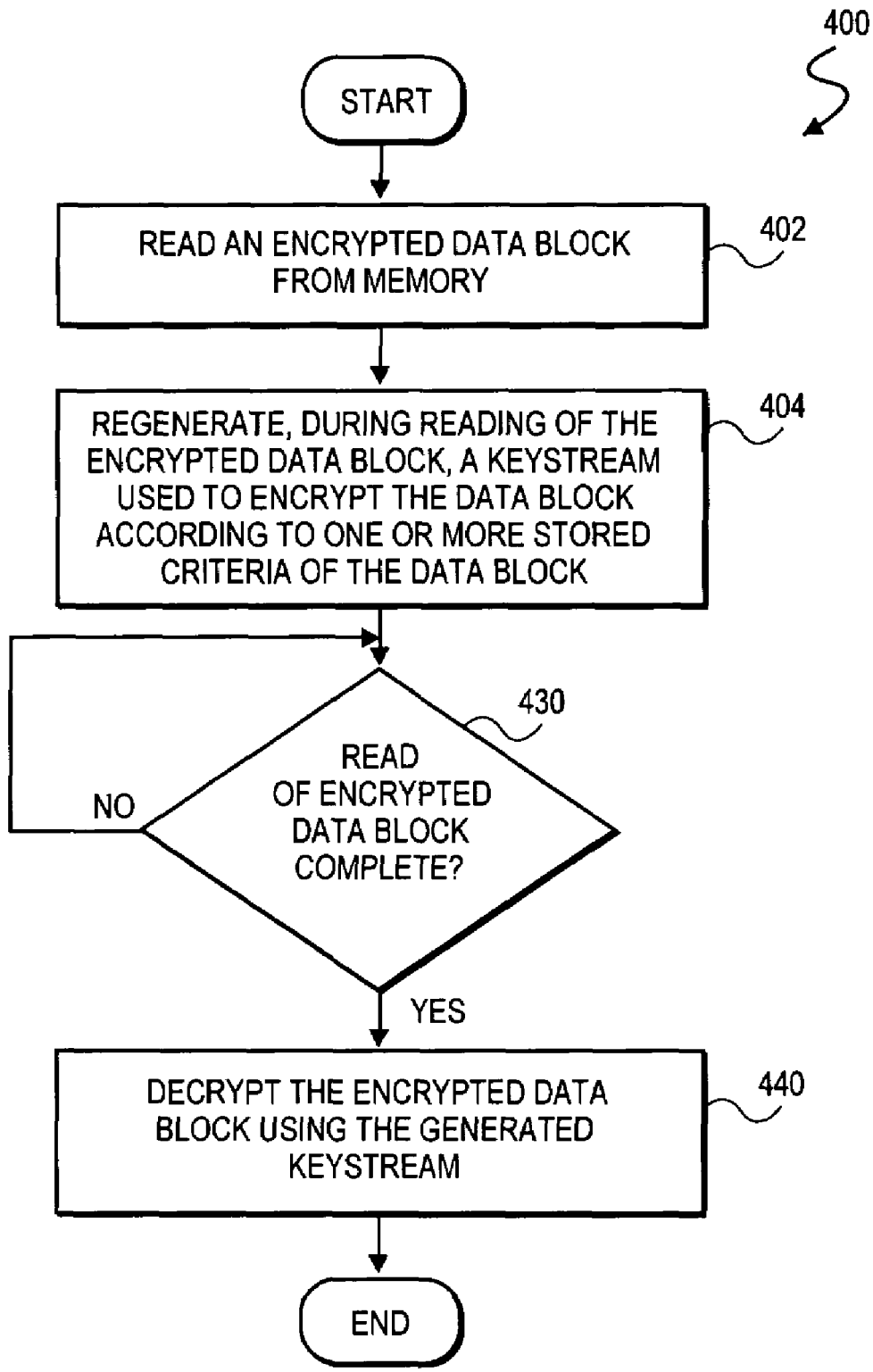
FIG. 6 is a flowchart illustrating a method for decryption of an encrypted data block read from memory, in accordance with one embodiment of the invention.

FIG. 6 is a flowchart illustrating a method 400 for decryption of an encrypted memory block with reduced decryption latency, in accordance with one embodiment of the invention. In one embodiment, method 400 is performed, for example, within encryption/decryption logic 200, as shown in FIG. 3. At process block 402, an encrypted data block (ciphertext) is read from memory, for example, in response to a request for the encrypted data block. In one embodiment, the memory described is, for example, RAM or non-volatile memory. Alternatively, the memory is referred to as disk memory within, for example, HDD 150 of FIG. 1.

As known to those skilled in the art, computer systems exhibit a significant amount of memory latency between a processor and the memory system. This latency prohibits conventional computer systems from providing processor memory encryption. However, in contrast to conventional systems, at process block 404, a keystream is regenerated during reading of the encrypted data block and, as a result, introduces minimal latency into the memory read operation. The regenerated keystream is the keystream that was used to encrypt the data block prior to writing the data block to memory.

In one embodiment, the keystream is regenerated according to one or more stored criteria of the data block, as described in detail below. Accordingly, at process block 430, once reading of the encrypted data block is complete, at process block 440, the encrypted data block is decrypted according to the generated keystream. In one embodiment, this is performed using a logical XOR operation and may be performed within a single clock cycle, thereby limiting introduced latency to a single clock cycle. As a result, memory latency between processor and memory is not exacerbated by the memory encryption techniques described herein.

Figure 7:
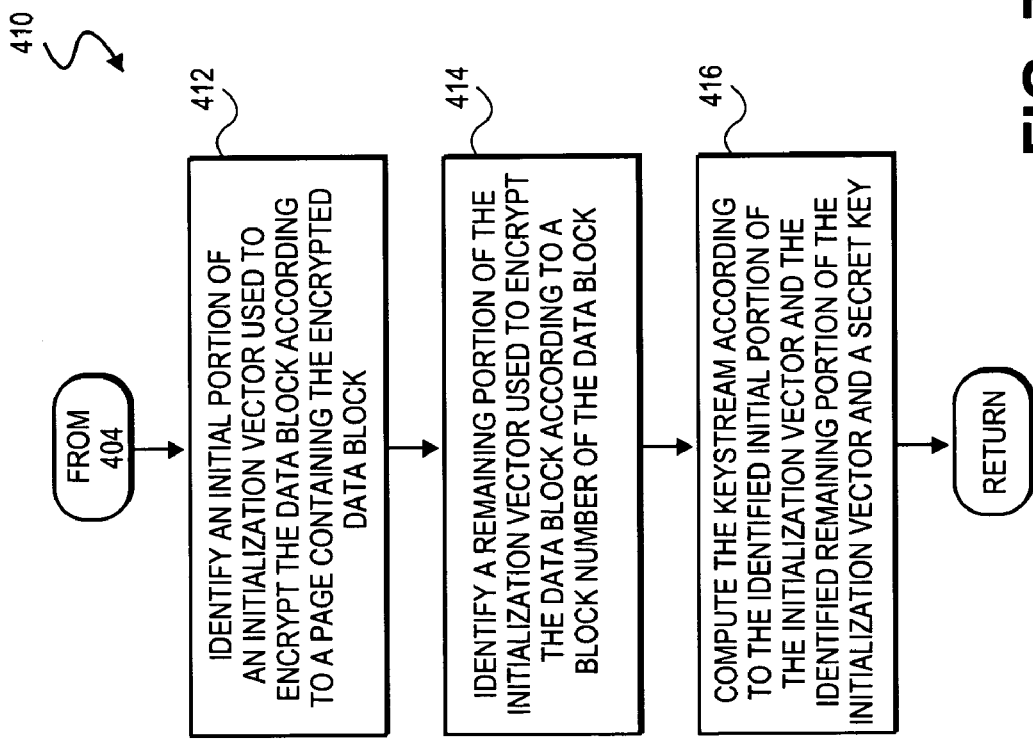
FIG. 7 is a flowchart illustrating a method for generating a keystream to decrypt an encrypted data block read from memory, in accordance with a further embodiment of the invention.

FIG. 7 is a flowchart illustrating a method 410 for regenerating the keystream of process block 404, as described with reference to FIG. 6 and in accordance with one embodiment of the invention. At process block 412, an initial portion (page IV) of an initialization vector used to encrypt the data block is identified according to a page containing the encrypted data block. In one embodiment, the page in conjunction with a block number provides an index to a data structure containing a plurality of initialization vectors (page IVs), such as PIV 280 (FIG. 3). As described, a paging system for accessing data blocks from memory is assumed within the embodiments described. However, the embodiments described may be applied to other forms of memory organization, as known to those skilled in the art.

At process block 414, a remaining portion of the initialization vector used to encrypt the data block is identified according to a block number of the data block such as, for example, a block counter value. At process block 416, a keystream is computed according to the identified initial portion of the initialization vector and the identified remaining portion of the initialization vector, as well as a secret key. As such, in the embodiments described, the initialization vector is made public or can be made public without jeopardizing the security of the memory encryption/decryption described herein.

Figure 8:
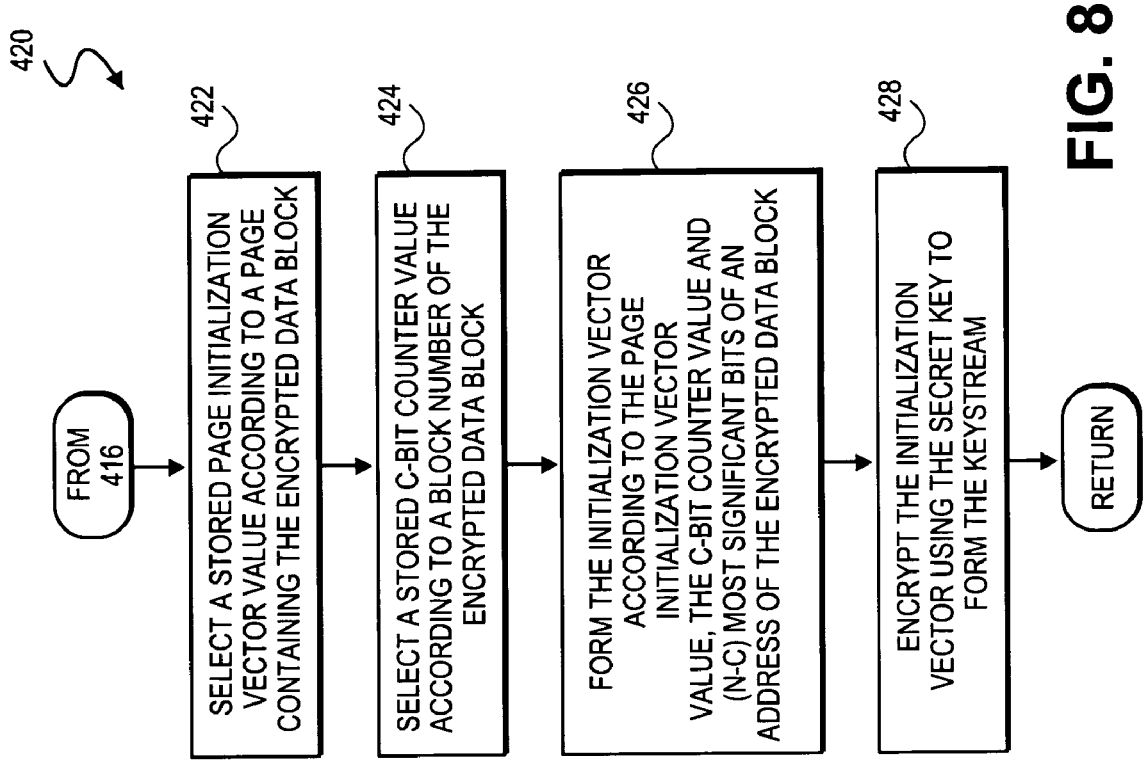
FIG. 8 is a flowchart illustrating a method for generating a keystream to decrypt an encrypted data block read from memory, in accordance with one embodiment of the invention.

FIG. 8 is a flowchart illustrating a method 420 for recomputing the keystream of process block 416 of FIG. 7, in accordance with a further embodiment of the invention. At process block 422, a stored page initialization vector is selected according to a page containing the encrypted data block. Once selected, at process block 424, a stored C-bit counter value is selected according to a block number of the encrypted data block. In one embodiment, these values are stored in, for example, encryption page structure 260, as depicted with reference to FIGS. 2-5. At process block 426, the initialization vector used to encrypt the data block is formed according to the page initialization vector value, the C-bit counter value and a (N-C) most significant bits of an address of the encrypted data block.

As described, the address is an N-bit value, whereas the counter is a C-bit value. Accordingly, as described, for example, with reference to FIG. 3, the initialization vector, or IV 220 is formed according to the indicated values. At process block 428, the formed initialization vector is encrypted using the secret key to form the keystream. As such, in the embodiment described, a block cipher may be used to form the keystream value during the decryption portion of the embodiments described. In one embodiment, the block cipher is a federal information processing (FIPS) symmetric key block cipher algorithm operated according to a counter mode (CTR).

Figure 9:
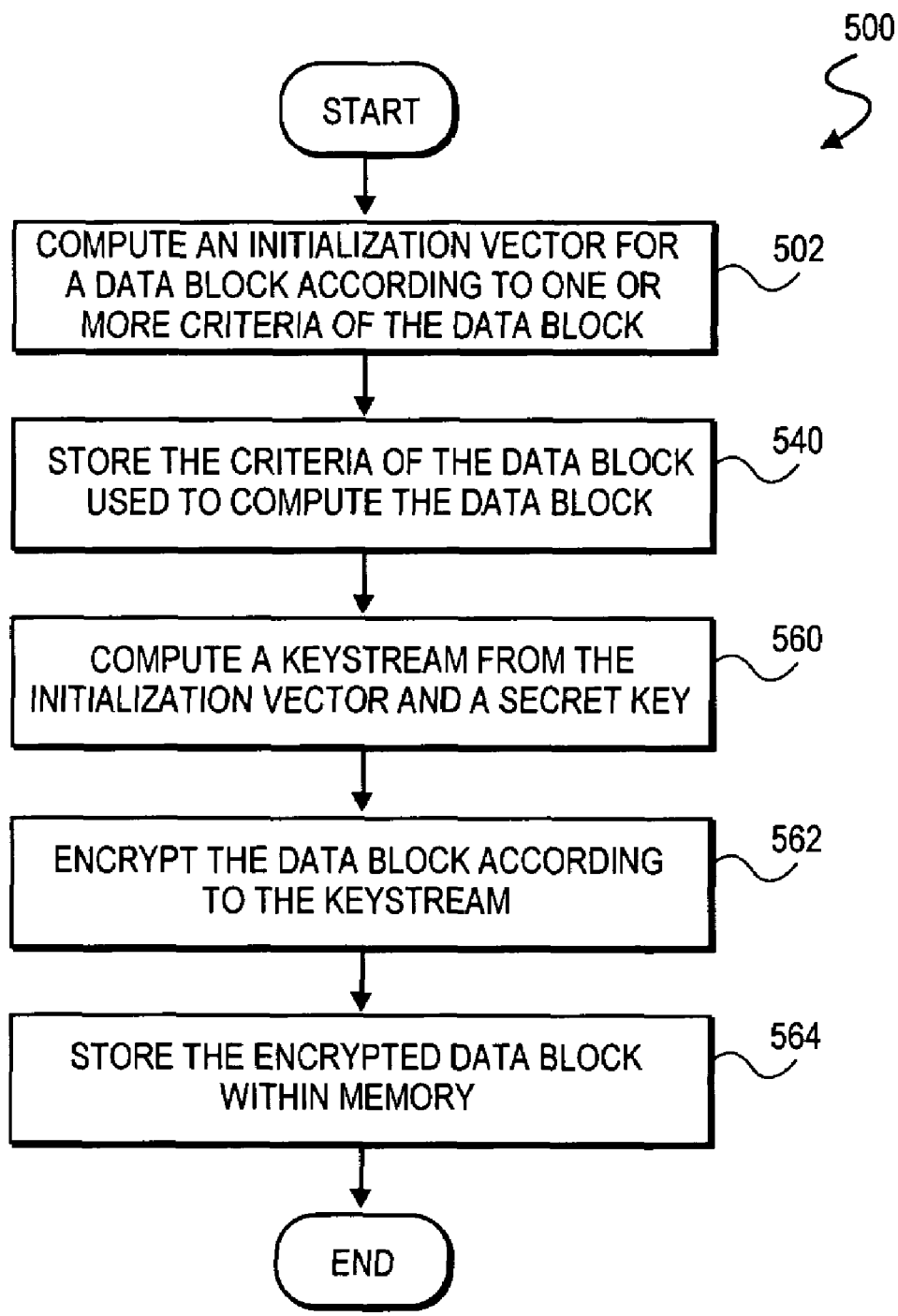
FIG. 9 is a flowchart illustrating a method for encrypting a data block prior to writing the data block to memory, in accordance with one embodiment of the invention.

FIG. 9 is a flowchart illustrating a method 500 for encryption of a data block prior to storing the data block within memory, in accordance with one embodiment of the invention. In the embodiment described, method 500 is illustrated with reference to encryption/decryption logic 200 of FIG. 4. At process block 502, an initialization vector is computed for a data block according to one or more criteria of the data block. In the embodiments described, the criteria may include an address of the data block, such as a page containing the data block and the block number of the data block. In addition, additional criteria may include, for example, one or more counter values according to the data block.

At process block 540, the criteria used to for the initialization vector is stored. In one embodiment, the criteria is stored within, for example, encryption page structure 260 (FIG. 4) to enable recomputation of the initialization vector. At process block 560, a keystream is computed from the initialization vector and a secret key using, for example, stream cipher 250 (FIG. 4). At process block 562, the data block is encrypted according to the keystream using, for example, an XOR operation. At process block 564, the encrypted data block is stored within memory, which includes non-volatile memory, disk memory, or the like as described above.

Figure 10:
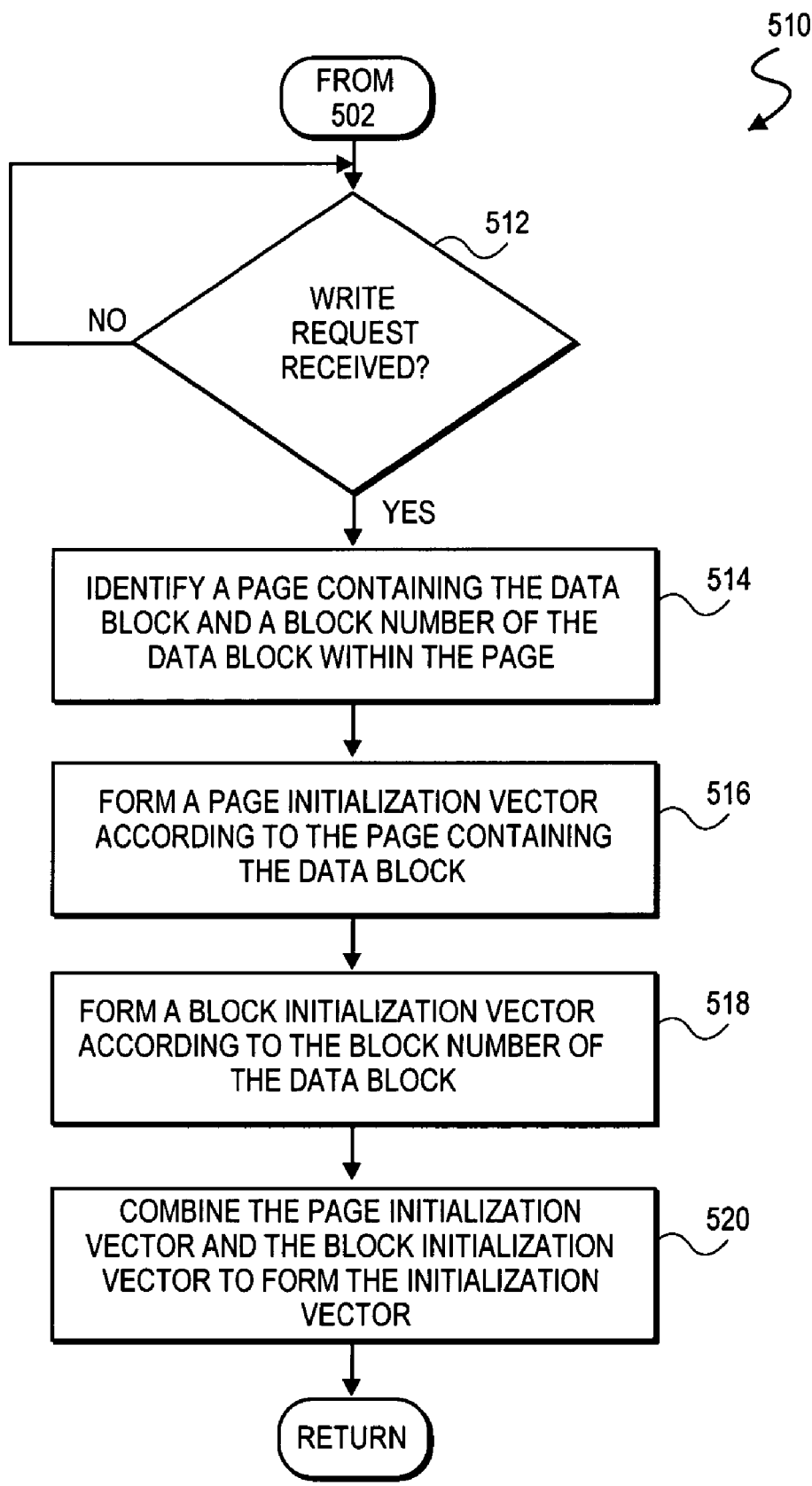
FIG. 10 is a flowchart illustrating a method for computing an initialization vector to enable formation of a keystream to encrypt a data block prior to writing the data block to memory, in accordance with one embodiment of the invention.

FIG. 10 is a flowchart illustrating a method 510 for computing the initialization vector of process block 502 of FIG. 9, in accordance with one embodiment of the invention. At process block 512, it is determined whether a write request is received. Once received, at process block 514, a page containing the requested data block and a block number of the requested data block are identified. At process block 516, a page initialization vector is formed according to the page containing the data block. At process block 518, a block initialization vector is formed according to the block number of the data block. At process block 520, the page initialization vector and the block initialization vector are combined to form the initialization vector used to encrypt the data block.

Figure 11:
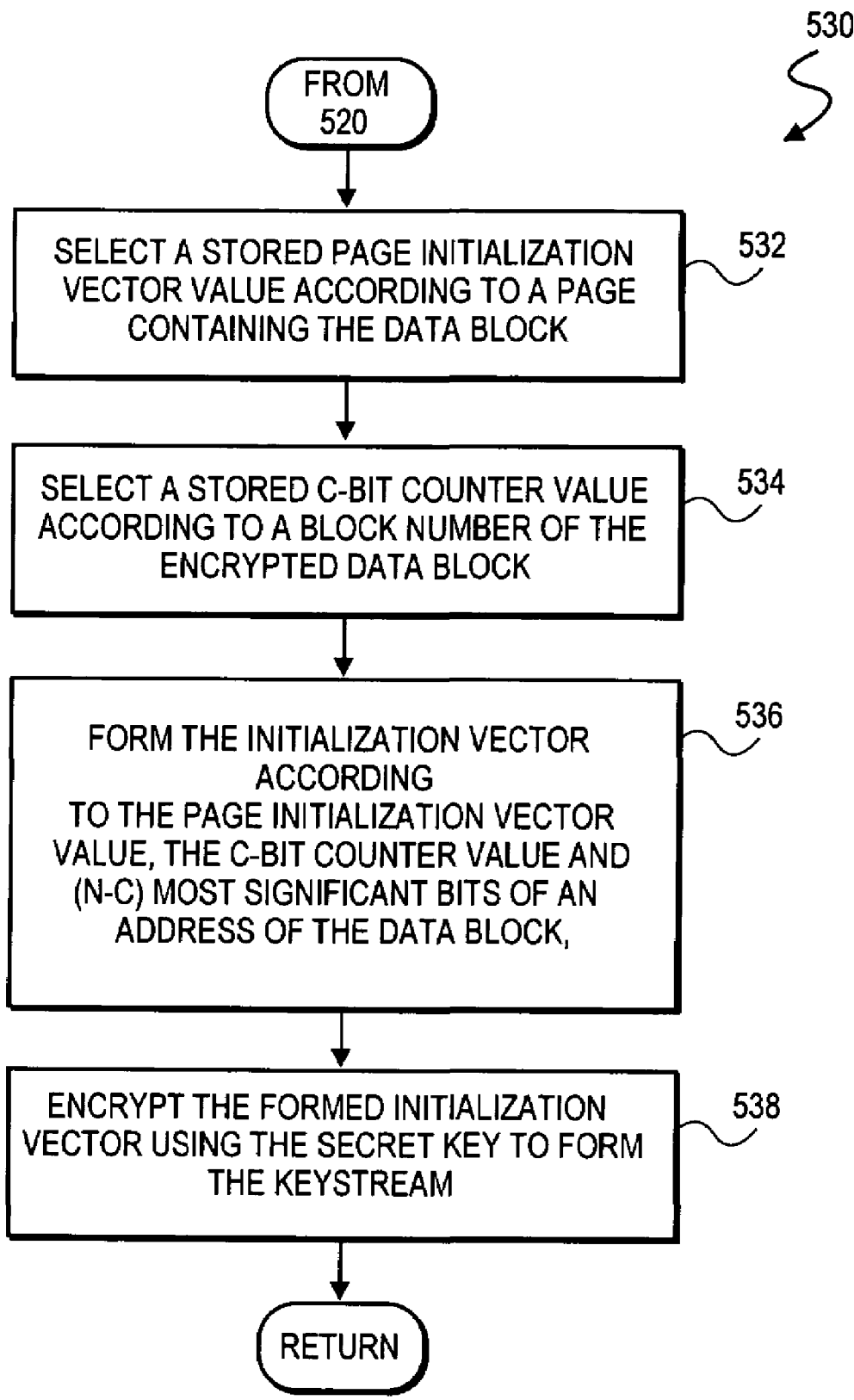
FIG. 11 is a flowchart illustrating a method for computing an initialization vector to enable formation of a keystream to encrypt a data block prior to writing the data block to memory, in accordance with a further embodiment of the invention.

FIG. 11 is a flowchart illustrating a method 530 for combining to form the initialization vector of process block 520 of FIG. 10, in accordance with one embodiment of the invention. At process block 532, a stored page initialization vector value is selected according to a page containing the encrypted data block and optionally a block number of the data block. At process block 534, a stored C-bit counter value is selected according to a block number of the encrypted data block. At process block 536, the initialization vector is formed according to the page initialization vector value, the C-bit counter value and an N-C most significant bit of an address of the encrypted data block.

As such, in the embodiment described, 128-bit encryption is provided for encryption of the data block. However, various N-bit encryption may be provided such that values may be added or subtracted from the initialization vector as desired. At process block 538, the initialization vector is encrypted using the secret key to form the keystream. In the embodiment described, encryption of the initialization vector using the keystream is performed, for example, using a stream cipher, such as for example, cipher logic 250 as described with reference to FIG. 4. As such, in the embodiments described, a block cipher may be used to perform encryption during memory read back whereas a stream cipher may be used to form a keystream during writing and encrypting of a data block in accordance with the embodiments described.

Figure 12:
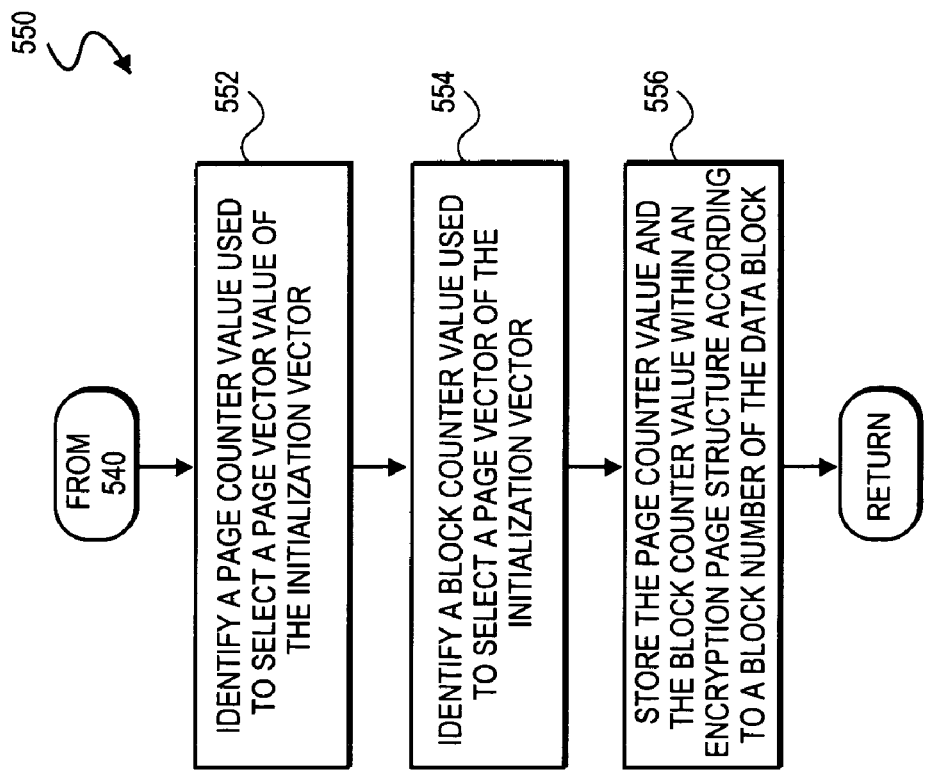
FIG. 12 is a flowchart illustrating a method for storing components of an initialization vector to enable reformation of the initialization vector to decrypt an encrypted data block, in accordance with one embodiment of the invention.

FIG. 12 is a flowchart illustrating a method 550 for storing the criteria used to form initialization vector of process block 540 of FIG. 9, in accordance with one embodiment of the invention. At process block 552, a page counter value used to select a page IV portion of the initialization vector is identified. Once identified, at process block 554, a block counter value used to form a block IV portion of the initialization vector is identified. Once identified, the page counter value and the block counter value are stored within an encryption page structure according to a block number of the data block.

Figure 5:
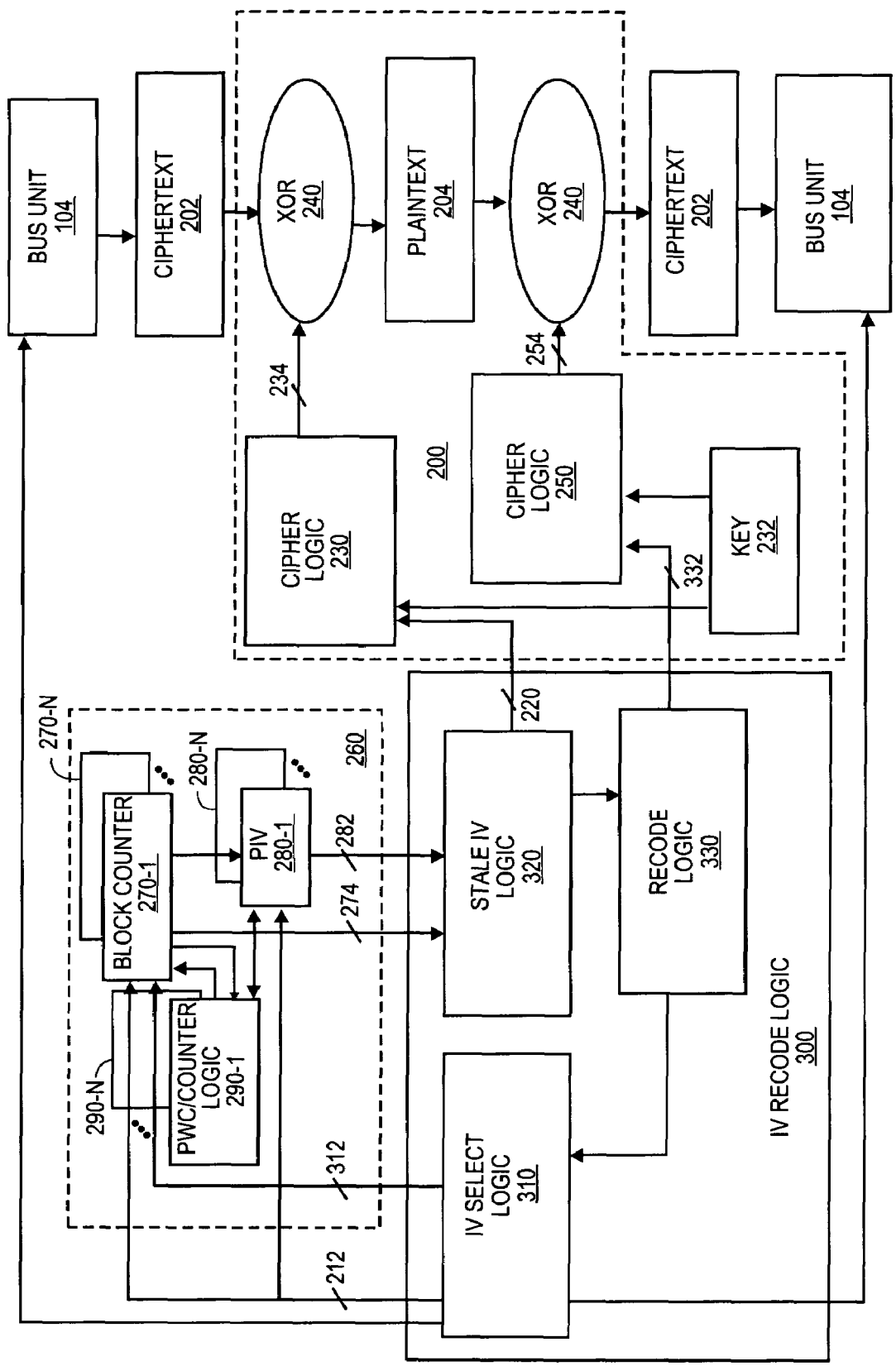
FIG. 5 is a block diagram illustrating initialization vector recode logic, in accordance with one embodiment of the invention.
Figure 13:
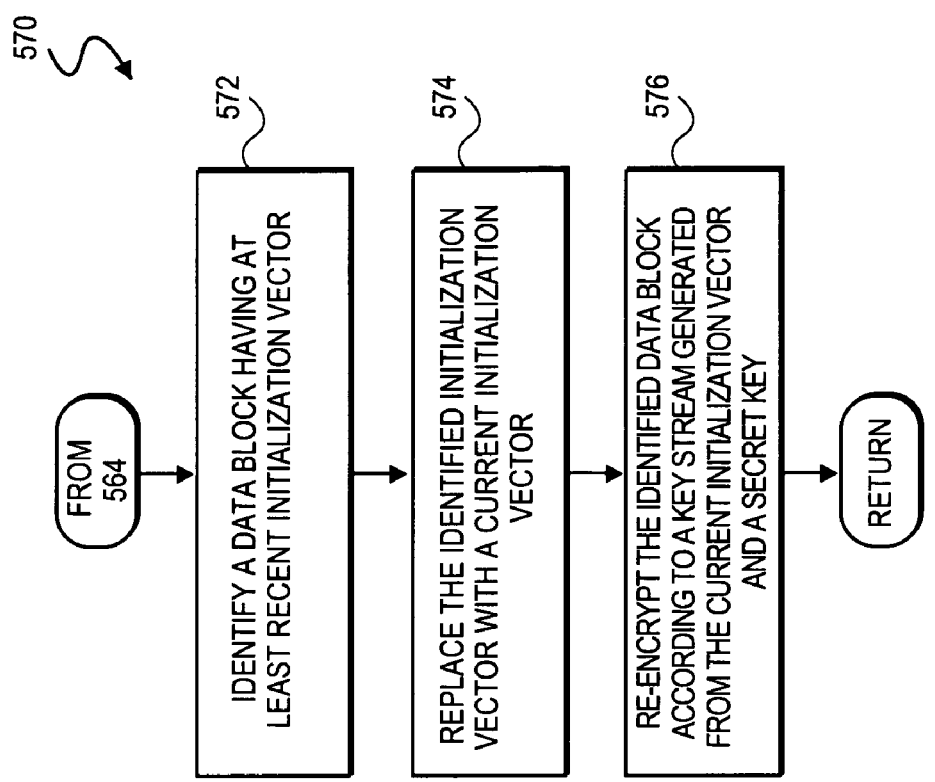
FIG. 13 is a flowchart illustrating a method for recoding an initialization vector, in accordance with one embodiment of the invention.

FIG. 13 is a flowchart illustrating a method 570 for recoding of an initialization vector, for example, as depicted with reference to FIG. 5 in accordance with a further embodiment of the invention. At process block 572, a data block having a least recent initialization vector is identified. In one embodiment, the identification of the data block is performed using Equation (1). Once identified, at process block 574, the identified initialization vector is replaced with a current initialization vector. In one embodiment, the current initialization vector is formed by replacing a page IV portion of the stale IV with a current page IV of PIV 280 indexed by a current value of IVC. Once replaced, the identified data block is re-encrypted according to a keystream generated from the current initialization vector and a secret key.

Figure 14:
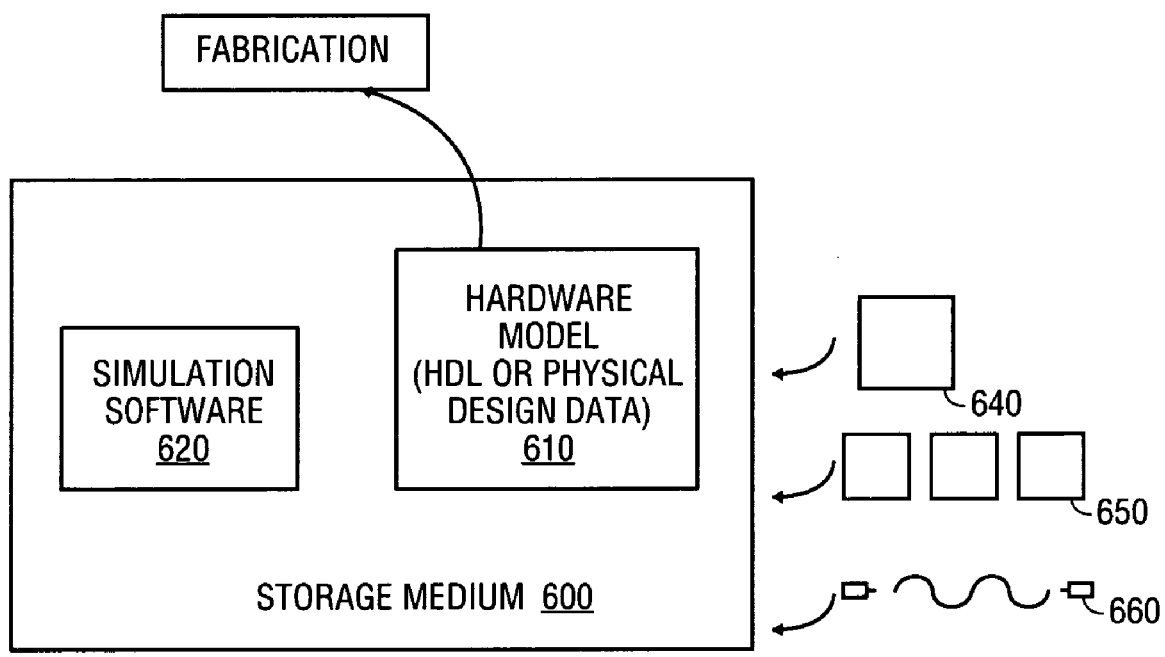
FIG. 14 is a block diagram illustrating various design representations or formats for simulation, emulation and fabrication of a design using the disclosed techniques.

FIG. 14 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 630 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable storage medium. An optical or electrical wave 660, modulated or otherwise generated to transport such information, provides an example of a machine readable transmission medium. A memory 650 or a magnetic or optical storage 640, such as a disk, may be a machine readable storage medium. Any machine readable transmission mediums may carry the design information. The term "carry" (e.g., a machine readable transmission medium carrying information) thus covers information encoded or modulated into or onto a carrier wave. The set of bits describing the design or a particular of the design are (when embodied in a machine readable storage medium) an article that may be sealed in and out of itself, or used by others for further design or fabrication.

ALTERNATE EMBODIMENTS

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the data bus power control approach of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
reading an encrypted data block from memory;
regenerating, within a predetermined time required to read the encrypted data block from the memory, a keystream used to encrypt the data block according to one or more stored criteria of the data block using a predetermined number of rounds of a cipher that are reduced to match a memory read latency of the memory; and
once reading of the encrypted data block is complete, decrypting the encrypted data block according to the generated keystream,
wherein re-generating the keystream comprises: identifying an initial portion of an initialization vector used to encrypt the data block according to a page containing the encrypted data block; identifying a remaining portion of the initialization vector used to encrypt the data block according to a block number of the data block; and recomputing the keystream according to the identified initial portion of initialization vector and the identified remaining portion of the initialization vector and a secret key.

2. The method of claim 1, wherein reading the encrypted data block comprises:
receiving a request for the encrypted data block; and
reading the encrypted data block from a random access memory.

3. The method of claim 1, wherein computing the keystream comprises: selecting a stored page initialization vector value according to a page containing the encrypted data block and a block number of the encrypted data block from an on-chip data structure containing one or more unique page initialization vectors; selecting a stored C-bit counter value according to the block number of the encrypted data block; reforming the initialization vector used to encrypt the data block according to the page initialization vector value, the C-bit counter value and (N-C) most significant bits of an address of the encrypted data block, where the address is an N-bit address; and encrypting the formed initialization vector using the secret key to form the keystream.

4. The method of claim 1, wherein decrypting the encrypted data block is performed within a single clock cycle.

5. An article of manufacture including a machine readable storage medium encoded with instructions which may be used to program a system to perform a method, comprising:
reading an encrypted data block from memory;
regenerating, within a predetermined time required to read the encrypted data block from the memory, a keystream used to encrypt the data block according to one or more stored criteria of the data block using a predetermined number of rounds of a cipher that are reduced to match a memory read latency of the memory; and
once reading of the encrypted data block is complete, decrypting the encrypted data block according to the generated keystream,
wherein prior to receiving the request the method comprises: identifying an initial portion of an initialization vector used to encrypt the data block according to a page containing the encrypted data block; identifying a remaining portion of the initialization vector used to encrypt the data block according to a block number of the data block; and recomputing the keystream according to the identified initial portion of initialization vector and the identified remaining portion of the initialization vector and a secret key.

6. The article of manufacture of claim 5, wherein prior to receiving the request the method comprises:
receiving a request for the encrypted data block; and
reading the encrypted data block from a random access memory.

7. The article of manufacture of claim 5, wherein prior to receiving the request the method comprises: selecting a stored page initialization vector value according to a page containing the encrypted data block and a block number of the encrypted data block from an on-chip data structure containing one or more unique page initialization vectors; selecting a stored C-bit counter value according to the block number of the encrypted data block; reforming the initialization vector used to encrypt the data block according to the page initialization vector value, the C-bit counter value and (N-C) most significant bits of an address of the encrypted data block, where the address is an N-bit address; and encrypting the formed initialization vector using the secret key to form the keystream.

8. The article of manufacture of claim 5, wherein decrypting the selected data block is performed within a single clock cycle.

9. A method comprising: computing an initialization vector for a data block according to one or more criteria of the data block, storing the criteria of the data block used to compute the initialization vector for the data block; computing a keystream from the initialization vector and a secret key using a predetermined number of rounds of a cipher that are reduced to match a memory read latency of a memory; encrypting the data block according to the keystream; and storing the encrypted data block within the memory,
wherein combining to form the initialization vector comprises: selecting a stored page initialization vector value according to a page containing the unencrypted data block from an on-chip data structure containing one or more unique page initialization vectors; selecting a stored C-bit counter value according to the block number of the encrypted data block; forming the initialization vector used to encrypt the data block according to the page initialization vector value, the C-bit counter value and (N-C) most significant bits of an address of the encrypted data block, where the address is an N-bit address; and encrypting the formed initialization vector using the secret key to form the keystream.

10. The method of claim 9, wherein computing the initialization vector comprises:
receiving a write request for the data block;

identifying a page containing the data block;
forming a page initialization vector according to the page containing the data block as the initialization vector of the data block.

11. The method of claim 9, wherein computing the initialization vector comprises:
receiving a write request for the data block;
identifying a page containing the data block and a block number of the data block within the page;
forming a page initialization vector according to the page containing the data block and the block number of the encrypted data block;
forming a block initialization vector according to the block number of the data block; and
combining the page initialization vector and the block initialization vector to form the initialization vector.

12. The method of claim 11, wherein forming the page initialization vector comprises:
identifying a plurality of page initialization vectors assigned to the page containing the data block from an on-chip data structure containing one or more unique page initialization vectors; and
selecting a page initialization vector according to a page counter value for the page containing the data block.

13. The method of claim 11, wherein forming the block initialization vector comprises:
selecting a block counter value for page writes to the page containing the data block as the block initialization vector.

14. The method of claim 9, wherein computing the keystream comprises:
providing the initialization vector and the secret key to one of a stream cipher and a block cipher to generate the keystream.

15. The method of claim 9, further comprising:
identifying a data block having a least recent initialization vector;
computing a unique initialization vector for the identified initialization vector; and
re-encrypting the identified data block according to a keystream generated from the unique initialization vector and a secret key.

16. The method of claim 15, wherein computing the unique initialization vector comprises:
identifying a current page initialization vector value according to a page counter value of a page containing the identified data block; and
replacing a page initialization vector portion of the identified initialization vector with the current page initialization vector value to form the unique initialization vector.

17. The method of claim 9, wherein storing the initialization vector comprises:
identifying a page counter value used to select a page vector value of the initialization vector;
identifying a block counter value used to form a block vector value of the initialization vector; and
storing the page counter value and the block counter value within an encryption page structure according to a block number of the data block.

18. A processor comprising: memory encryption logic to store one or more criteria of a data block used to compute an initialization vector for the data block, to encrypt the data block according to a keystream computed from the initialization vector and a secret key, and to store the encrypted data block within memory; and memory decryption logic to regenerate, within a predetermined time required to complete an encrypted data block read, a keystream used to encrypt the data block according to one or more stored criteria of the data block using a predetermined number of rounds of a cipher that are reduced to match a memory read latency of the memory and to decrypt the encrypted data block using the regenerated keystream,
wherein the encryption logic further comprises recode logic to identify a data block having a least recent initialization vector, recompute a unique initialization vector for the identified initialization vector, and re-encrypt the identified data block according to a keystream generated from the unique initialization vector and a secret key.

19. The apparatus of claim 18, wherein the encryption logic further comprises:
a memory including an encryption page structure having a page data structure containing one or more unique page initialization vector values used in formation of initialization vectors, and a block data structure used to store an index value to the page data structure and block data structure used to form an initialization vector for recomputation of a keystream and to encrypt data blocks.

20. The apparatus of claim 18, wherein the decrypt logic decrypts encrypted data blocks within a single clock cycle using an exclusive-OR operation.

21. The apparatus of claim 18, wherein the memory is one of random access memory and disk memory.

22. A system comprising: a random access memory (RAM); a chipset coupled to the memory; and a processor coupled to the chipset, the processor including: memory encryption logic to store one or more criteria of a data block used to compute an initialization vector for the data block, to encrypt the data block according to a keystream computed from the initialization vector and a secret key, and store the encrypted data block within the memory, and memory decryption logic to regenerate, within a predetermined time required to complete an encrypted data block read from the memory, a keystream used to encrypt the data block according to one or more stored criteria of the data block using a predetermined number of rounds of a cipher that are reduced to match a memory read latency of the memory and to decrypt the encrypted data block using the regenerated keystream,
wherein the encryption logic further comprises recode logic to identify a data block having a least recent initialization vector, replace the identified initialization vector with a current initialization vector, and re-encrypt the identified data block according to a keystream generated from the current initialization vector and a secret key.

23. The system of claim 22, wherein the encryption logic further comprises:
a memory including an encryption page structure having a page data structure containing one or more unique page initialization vector values used in formation of initialization vectors, and a block data structure used to store an index value to the page data structure and block data structure used to form an initialization vector for recomputation of a keystream and to encrypt data blocks.

24. The system of claim 22, wherein the decrypt logic decrypts encrypted data blocks within a single clock cycle using an exclusive-OR operation.

25. The system of claim 22, wherein the RAM memory is double data rate (DDR) synchronous data RAM (SDRAM).

* * * * *